United States Patent
Plisko et al.

(10) Patent No.: US 9,612,913 B2
(45) Date of Patent: Apr. 4, 2017

(54) SYSTEM, METHOD AND A NON-TRANSITORY COMPUTER READABLE MEDIUM FOR PROTECTING SNAPSHOTS

(71) Applicant: Infinidat LTD., Herzliya (IL)

(72) Inventors: Cyril Plisko, Petah Tikvah (IL); Alex Goldberg, Rehovot (IL); Mike Selivanov, Hod-Hasharon (IL)

(73) Assignee: INFINIDAT LTD., Herzliya (IL)

( * ) Notice: Subject to any disclaimer, the term of this patent is extended or adjusted under 35 U.S.C. 154(b) by 134 days.

(21) Appl. No.: 14/474,379

(22) Filed: Sep. 2, 2014

(65) Prior Publication Data

US 2016/0062842 A1    Mar. 3, 2016

(51) Int. Cl.
 G06F 11/08    (2006.01)
 G06F 11/14    (2006.01)

(52) U.S. Cl.
 CPC ...... G06F 11/1451 (2013.01); G06F 11/1471 (2013.01); G06F 2201/84 (2013.01)

(58) Field of Classification Search
 CPC .......................... G06F 11/1471; G06F 2201/84
 USPC .......................................................... 714/20
 See application file for complete search history.

(56) References Cited

U.S. PATENT DOCUMENTS

| | | | | |
|---|---|---|---|---|
| 6,728,735 B1* | 4/2004 | Fong | ................... | G06F 11/1471 707/642 |
| 7,398,350 B1* | 7/2008 | Valiveti | ................ | G06F 3/0619 711/111 |
| 7,694,191 B1* | 4/2010 | Bono | ..................... | G06F 11/004 714/48 |
| 8,555,022 B1* | 10/2013 | Edwards | ............... | G06F 3/0607 711/114 |
| 8,719,520 B1* | 5/2014 | Piszczek | ............. | G06F 11/1076 709/219 |
| 2002/0049718 A1* | 4/2002 | Kleiman | ............. | G06F 11/1435 |
| 2005/0216535 A1* | 9/2005 | Saika | .................. | G06F 11/1451 |
| 2006/0265568 A1* | 11/2006 | Burton | ................ | G06F 12/0862 711/216 |
| 2007/0168706 A1* | 7/2007 | Humlicek | ........... | G06F 11/1092 714/6.12 |
| 2007/0245104 A1* | 10/2007 | Lindemann | ......... | G06F 11/1469 711/162 |
| 2011/0197024 A1* | 8/2011 | Thomas | .............. | G06F 11/2094 711/114 |
| 2012/0084504 A1* | 4/2012 | Colgrove | .............. | G06F 3/0605 711/114 |
| 2013/0198476 A1* | 8/2013 | Nakajima | ............. | G06F 3/0607 711/165 |
| 2014/0075110 A1* | 3/2014 | Benhase | ............... | G06F 3/0619 711/114 |
| 2014/0089580 A1* | 3/2014 | Yochai | .................... | G06F 3/162 711/114 |

* cited by examiner

*Primary Examiner* — Chae Ko
(74) *Attorney, Agent, or Firm* — Reches Patents

(57) ABSTRACT

A method for protecting snapshots related to a logical unit, the method may include retrieving snapshots blocks that were destaged in a storage system; processing, by the storage system, the snapshots blocks to provide, by an information protection module of the storage system, snapshots redundancy information; and storing the snapshots redundancy information in the storage system.

18 Claims, 4 Drawing Sheets

SYSTEM, METHOD AND A NON-TRANSITORY COMPUTER READABLE MEDIUM FOR PROTECTING SNAPSHOTS

BACKGROUND

Logical volumes of a storage system change over time. The content of a logical volume at different points in time may be represented by snapshots. In a sense a snapshot is a frozen version of the logical volume as it was at a certain point in time.

For example, each logical volume may have snapshots $SNj(i)$ wherein j is the identifier of the logical volume, and i is a running index of snapshots (points in time) for the given volume.

Consecutive snapshots of a certain logical volume may be represented in various manners.

Each snapshot may be retrieved by snapshot metadata. For example—each snapshot may have snapshot metadata that may point to the entire data blocks that form the snapshot. Yet for another example—a snapshot may be retrieved using snapshot metadata that points to differences (deltas) between the snapshot and a previous snapshot.

Accordingly—snapshots $Nj(2)$ can be represented by differences in the content of the j'th logical volume between the time of creation of $SNj(1)$ and the time of creation of $SNj(2)$.

Snapshots may be used in order to recover a corrupted logical volume. There is a growing need to provide mechanism for enhancing the reliability of snapshots.

SUMMARY

According to an embodiment of the invention a method may be provided for protecting snapshots related to a logical unit, the method may include retrieving snapshots blocks that were destaged in a storage system; evaluating a protection metric of the snapshots associated with the snapshots blocks; determining, in response to the protection metric, whether to process the snapshots blocks to provide snapshots redundancy information; if it determined to process the snapshots blocks then processing the snapshots blocks, by an information protection module of the storage system, to provide the snapshots redundancy information; and storing the snapshots redundancy information in the storage system; and if it determined not to process the snapshots blocks then preventing from processing the snapshots blocks thereby preventing from providing the snapshots redundancy information.

According to an embodiment of the invention a method may be provided for protecting snapshots related to a logical unit, the method may include retrieving snapshots blocks that were destaged in a storage system; processing, by the storage system, the snapshots blocks to provide, by an information protection module of the storage system, snapshots redundancy information; and storing the snapshots redundancy information in the storage system.

The snapshots blocks may include snapshots data blocks reflecting a content of snapshots and parity blocks.

The snapshots blocks may form snapshots that represent contents of the logical unit at different points in time; wherein the snapshots are associated with snapshots metadata; wherein the snapshots metadata facilitates a retrieval of deltas indicative of differences between different snapshots; wherein the processing of the snapshots blocks may include s processing snapshots blocks of deltas to provide at least a portion of the snapshots redundancy information.

The method may include associating the snapshots blocks with the snapshots redundancy information.

The snapshots blocks are associated with parity units that were calculated by applying a first protection scheme before the retrieving of the snapshots blocks; wherein the processing of the snapshots blocks involves applying a second protection scheme.

The first protection scheme may differ from the second protection scheme.

The first protection scheme may equal the second protection scheme.

The method may include evaluating a protection metric of snapshots associated with the snapshots blocks; and determining, in response to the protection metric, a second protection scheme to be applied during the processing of the snapshots blocks.

The method may include evaluating a protection metric of snapshots associated with the snapshots blocks; and determining, in response to the protection metric, whether to (a) execute the processing of the snapshots blocks or (b) prevent from processing of the snapshots blocks.

Embodiments of the invention include a computer readable medium that is non-transitory and may store instructions for performing the above-described methods and any steps thereof, including any combinations of same.

For example, the computer readable medium may store instructions to be executed by a computerized system for retrieving snapshots blocks that were destaged in a storage system; processing, by the storage system, the snapshots blocks to provide, by an information protection module of the storage system, snapshots redundancy information; and storing the snapshots redundancy information in the storage system.

The snapshots blocks form snapshots that represent contents of the logical unit at different points in time; wherein the snapshots are associated with snapshots metadata; wherein the snapshots metadata facilitates a retrieval of deltas indicative of differences between different snapshots; wherein the processing of the snapshots blocks may include s processing snapshots blocks of deltas to provide at least a portion of the snapshots redundancy information.

The non-transitory computer readable medium may store instructions for associating the snapshots blocks with the snapshots redundancy information.

The snapshots blocks are associated with parity units that were calculated by applying a first protection scheme before the retrieving of the snapshots blocks; wherein the processing of the snapshots blocks involves applying a second protection scheme.

The non-transitory computer readable medium may store instructions for evaluating a protection metric of snapshots associated with the snapshots blocks; and determining, in response to the protection metric, a second protection scheme to be applied during the processing of the snapshots blocks.

The non-transitory computer readable medium may store instructions for evaluating a protection metric of snapshots associated with the snapshots blocks; and determining, in response to the protection metric, whether to (a) execute the processing of the snapshots blocks or (b) prevent from processing of the snapshots blocks.

Yet for another example, the computer readable medium may store instructions to be executed by a computerized system for retrieving snapshots blocks that were destaged in a storage system; evaluating a protection metric of the snapshots associated with the snapshots blocks; determining, in response to the protection metric, whether to process the snapshots blocks to provide snapshots redundancy information; if it determined to process the snapshots blocks then: processing the snapshots blocks, by an information protection module of the storage system, to provide the snapshots redundancy information; and storing the snapshots redundancy information in the storage system; and if it determined not to process the snapshots blocks then preventing from processing the snapshots blocks thereby preventing from providing the snapshots redundancy information.

Additional embodiments of the invention include a system arranged to execute any or all of the methods described above, including any stages—and any combinations of same. For example, the storage system may include a destage and retrieval module that is arranged to retrieve snapshots blocks that were destaged in the storage system; an information protection module that is arranged to process the snapshots blocks to provide snapshots redundancy information; wherein the destage and retrieval module is arranged to store the snapshots redundancy information in the storage system.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
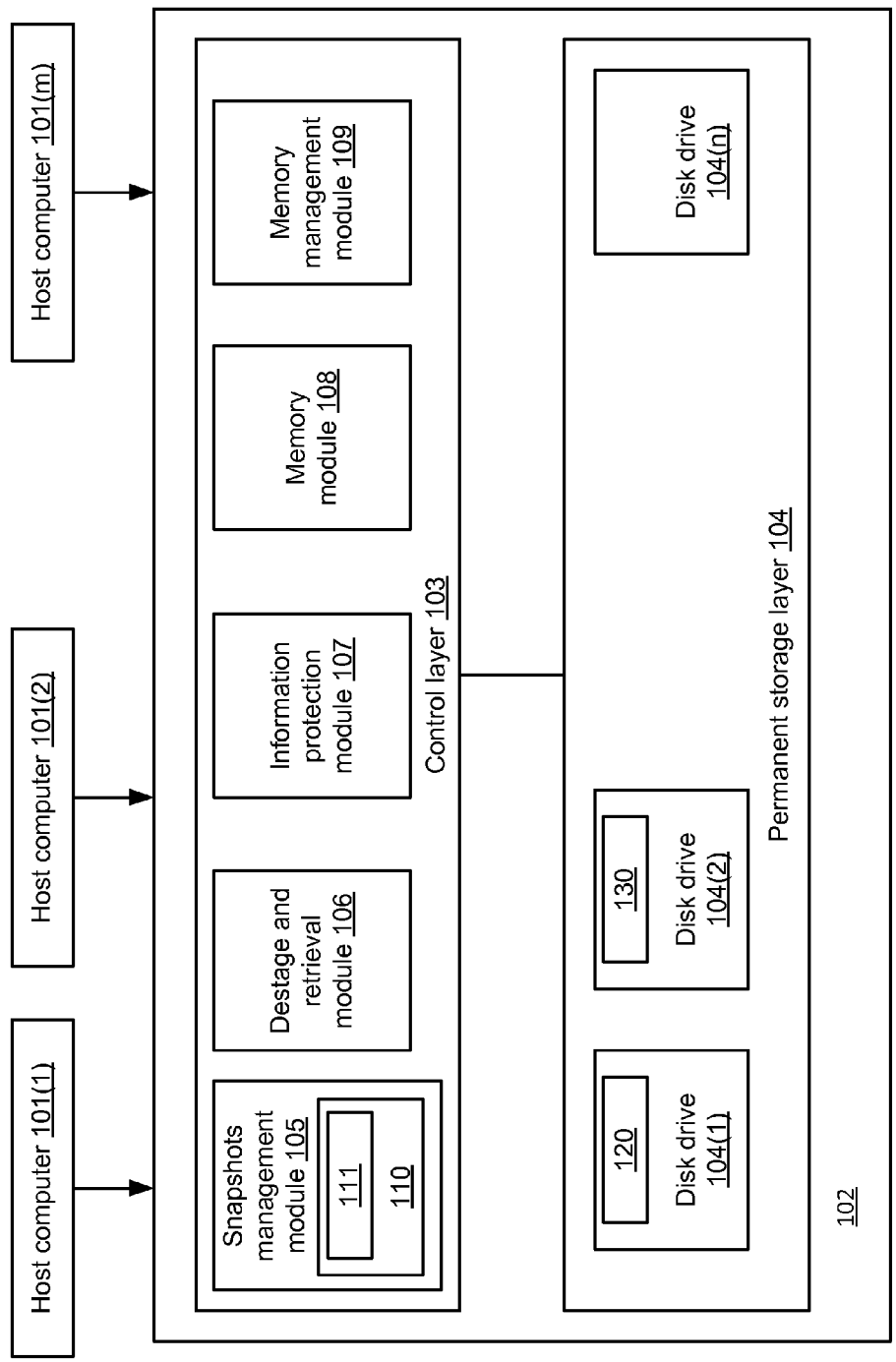
FIG. 1 illustrates a system according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE DRAWINGS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The terms logical unit and logical volume are used in an interchangeable manner in the application.

The terms unit and block may represent any combination of bits. Snapshots may be formed by snapshots blocks. Snapshot blocks may include data snapshot blocks and may include parity blocks.

Redundancy information is generated by applying information protection schemes. Non-limiting examples of information protection schemes include redundant array of independent disks (RAID) protection schemes. A non-limiting example of redundancy information is a parity unit. For simplicity of explanation some of the following examples may refer to a parity unit. The information protection scheme may be applied as a part of a destaging process. For example, when destaging a stripe of data units, using a RAID6 information protection scheme, two parity units are added to the stripe and written to two disk drives of the disk array. The stripe of data unit may include one or more snapshots data blocks and after the two parity units are added the snapshots blocks may include data and parity blocks.

FIG. 1 illustrates storage system 102 according to an embodiment of the invention. The storage system 102 may store petabytes of data and even more.

The storage system 102 may be coupled to one or more host computers 101(1)-**101(*m*)**.

The storage system 102 includes a control layer 103 and a permanent storage layer 104.

The permanent storage layer 104 is illustrated as including multiple disk drives 104(1)-**104(*n*). It is noted that the permanent storage layer 104** may include any type and/or arrangement of non-volatile memory modules.

The permanent storage layer 104 may support a physical storage space optionally distributed over one or more disk drives. The physical storage space may be mapped to one or more logical memory spaces. The one or more logical memory spaces may belong to one or more layers and/or one or more volumes. Each logical memory space may include one or more logical units such as logical volumes.

The control layer 103 may include one or more appropriate storage control devices operatively coupled to the plurality of host computers 101(1)-101(m) and operable to control access operations between the plurality of host computers and the a permanent storage layer 104. The storage control devices may be servers, computers and/or processors.

FIG. 1 illustrates the control layer 103 as including a snapshot management module 105, a destage and retrieval module 106, an information protection module 107, a memory module 108 and a memory management module 109. Any module may include hardware such as a processor.

The snapshot management module 105 is arranged to manage snapshots of logical units. The snapshot management module 105 may generate snapshots metadata for retrieving snapshots. It may, for example, calculate deltas and/or calculate pointers to data units that belong to one or more snapshots. For example, snapshots Nj(2) can be retrieved using snapshot metadata that allows a retrieval of a delta D(2) indicative of differences between SNj(1) and SNj(2). Snapshots Nj(2) can be reconstructed using snapshot metadata that allows a retrieval of delta D(2) and the content of SNj(1).

The destage and retrieval module 106 is arranged to manage (a) the destaging of information (including but not limited to snapshots blocks) from a cache memory such as memory module 108 to the permanent storage layer 104 and (b) a retrieval of the destaged information (including but not limited to snapshots blocks) from the permanent storage layer 104.

The memory module 108 may store information received from the host computers 101(1)-101(m) before the information is destaged to the permanent storage layer 104. The memory module 108 may also store information that was retrieved from the permanent storage layer 104. The retrieved information stored in memory module 108 may then be processed and/or sent to host computers 101(1)-101(m). Accordingly—memory module 108 can be regarded as a cache memory.

The memory management module 109 may manage the storing of information in the memory module 108 and/or the retrieval of information from the memory module 108.

The information protection module 107 may be arranged to apply one or more information protection schemes on information that is stored in the storage system 102. The information protection module 107 may be arranged to process snapshots blocks (that were destaged and then retrieved from the permanent storage layer 104) to provide snapshots redundancy information.

The information protection module 107 may be a part of the destage and retrieval module 106, although FIG. 1 illustrates both entities (107 and 106) as being separate from each other.

According to an embodiment of the invention, the destage and retrieval module 106 may be arranged to retrieve snapshots blocks that were destaged in the storage system. The information protection module 107 is arranged to process the snapshots blocks to provide snapshots redundancy information. The destage and retrieval module 106 is further arranged to store the snapshots redundancy information in the storage system.

According to an embodiment of the invention, the control layer 103 may be arranged to associate the snapshots blocks with the snapshots redundancy information.

The associating of the snapshots blocks with the snapshots redundancy information may include linking between the snapshots blocks and the snapshots redundancy information. This may allow the storage system 102 to retrieve the snapshots redundancy information and use the snapshots redundancy information to reconstruct the snapshots blocks, if the snapshots blocks are corrupted. The association may include associating pointers (or other metadata) required for retrieving the snapshots blocks and the snapshots redundancy information.

FIG. 1 illustrates a snapshot management data structure 110 that is managed by snapshot management module 105 and includes metadata about the snapshots of various data units. This metadata includes association information 111 for associating between the snapshots redundancy information 120 and the snapshots 130. Any type of associating information may be used—including but not limited to pointers, a mapping table and the like.

FIG. 1 illustrates the snapshot management data structure 110 as being stored in the snapshot management module 105. FIG. 1 also illustrates that the snapshots redundancy information 120 and the snapshots 130 are stored in the permanent storage layer 104.

It is noted that copies of at least portion of the snapshots redundancy information 120 and the snapshots 130 may be stored in the control layer 103 or in both the control layer 103 and in the permanent storage layer 104.

The snapshots redundancy information 120 and the snapshots 130 may be stored at different locations or in the same memory regions.

According to an embodiment of the invention, before snapshot blocks are first destaged from the memory module 108 to the permanent storage layer 104—the control layer 103 may process the snapshot blocks by applying a first protection scheme to generate parity units. A non-limiting example of such calculation includes applying a certain RAID compliant information protection scheme.

It is noted that the storage system 102 may retrieve the snapshot and calculate snapshots redundancy information using a second protection scheme.

It is further notes that the storage system 102 may decide when to calculate snapshots redundancy information to data of snapshots (snapshots data blocks) that was already destaged and may determine how to calculate the snapshots redundancy information. The determination may be responsive to various criteria including but not limited to a metric such as current protection level of the snapshots, a desired level of protection to the snapshots, success or failure of reconstruction of snapshots, actual or expected snapshot corruption events and the like.

Figure 2:
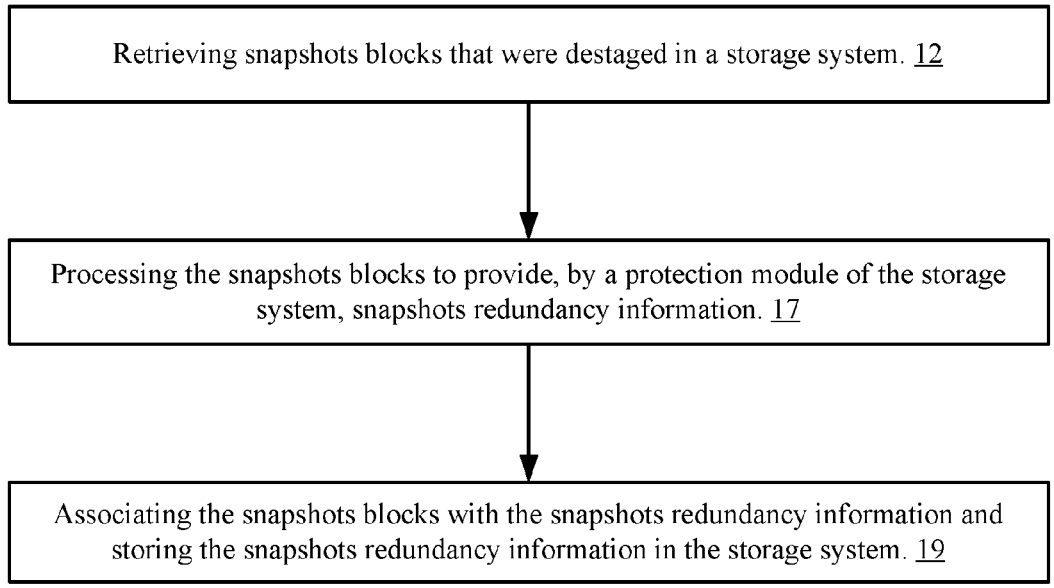
FIG. 2 illustrates a method according to an embodiment of the invention.
Figure 3:
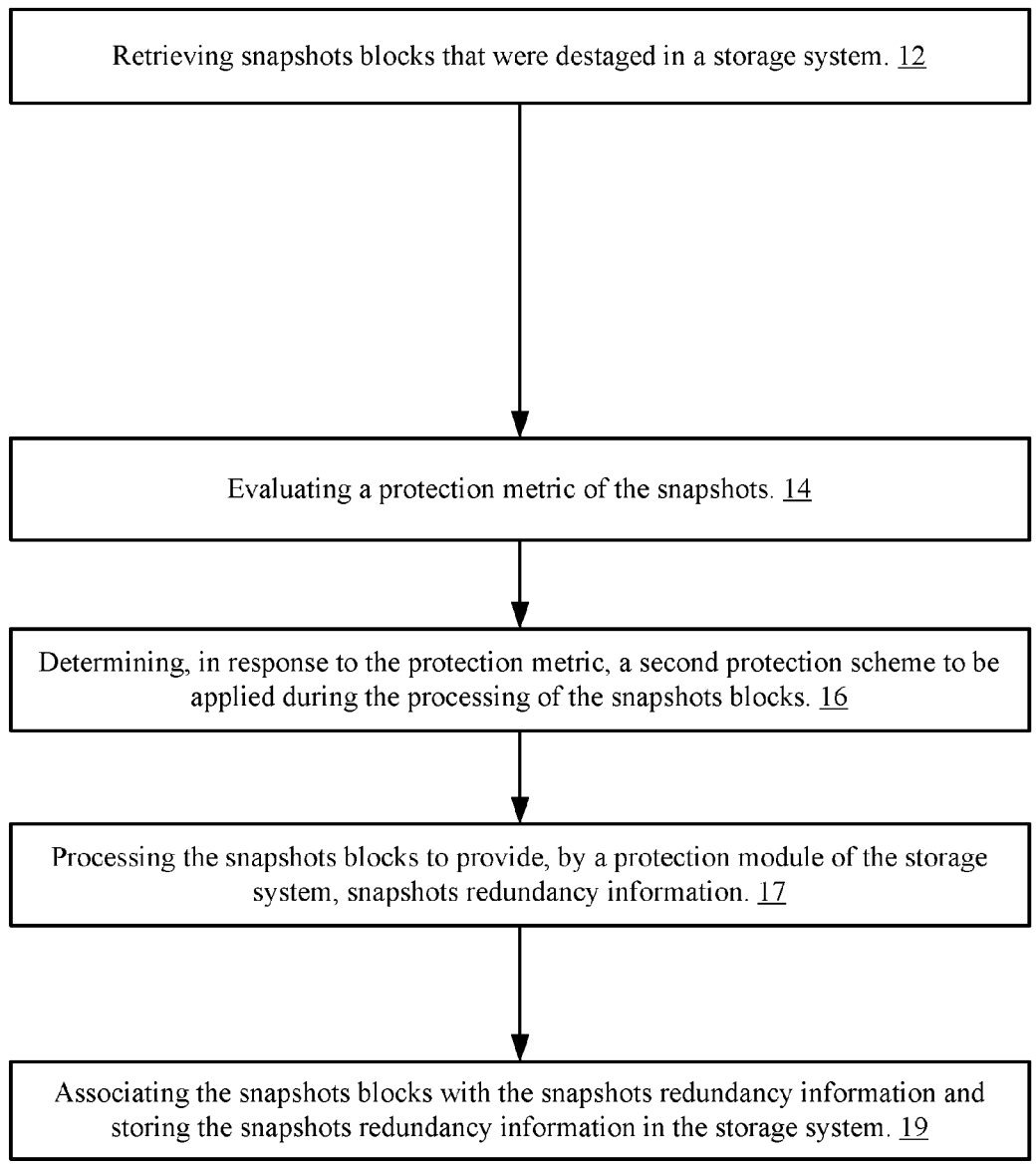
FIG. 3 illustrates a method according to an embodiment of the invention.
Figure 4:
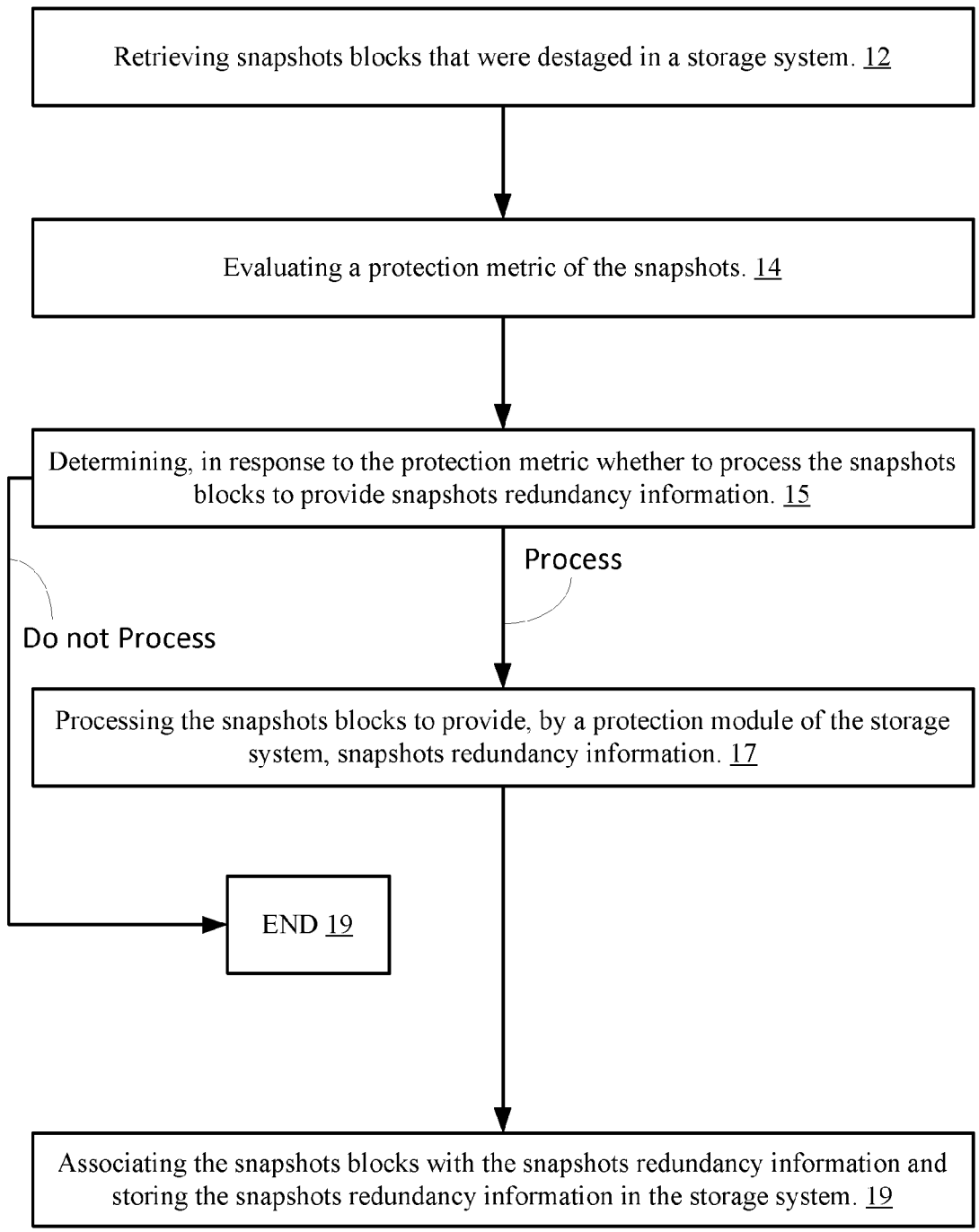
FIG. 4 illustrates a system according to an embodiment of the invention.

FIGS. 2-4 illustrate method 10, 20 and 30 according to various embodiments of the invention.

Any one of method 10, 20 and 30 may be executed as a background process—thereby is does not interfere with the creation of snapshots or any other process related to the management and/or destaging of snapshots' data (destaging of snapshot data blocks and/or parity blocks). Any one of methods 10, 20 and 30 may be executed in response to various storage system constraints such as load, available storage system resources and the like. For example—more resources (computational and/or storage resources) can be allocated to the execution of method 10, 20 and/or 30 when the storage system is less busy (for example lower IO activity level).

Any one of method 10, 20 and 30 may be triggered when snapshots are not protected, are not sufficiently protected, because the protection scheme used during the creating and/or destaging of the data of snapshots is unknown or because the protection scheme used during the creating and/or destaging of the data of snapshots cannot be trusted.

Referring to FIG. 2—method 10 may start by stage 12 of retrieving snapshots blocks of snapshots that were taken prior to stage 12, wherein the snapshots blocks were destaged in a storage system prior to stage 12.

The snapshots blocks may be associated with (or include) parity units that were calculated by applying a first protection scheme during a destaging of the snapshots blocks and before the executing of stage 12 of retrieving of the snapshots blocks.

The retrieving of stage 12 may include utilizing the parity units to reconstruct the snapshots blocks 130, extracting the snapshots from retrieved information (such as RAID stripes) that include both the snapshots blocks and the parity units, and the like.

Stage 12 may be followed by stage 17 of processing the snapshots blocks to provide, by a protection module of the storage system, snapshots redundancy information.

Stage 17 may include providing additional parity units. These parity units are additional as they are added to existing (if such exits) parity information that were calculated before the retrieving.

The processing may include calculating one or more additional parity units for each predefined number of snapshots data blocks units associated with the snapshot. The processing can be applied to all the snapshots data blocks or only to snapshots data blocks associated with the snapshot that are not associated with the previously taken snapshot (deltas). The snapshots blocks may include additional parity units that were calculated to all the snapshots blocks associated with the snapshot or only to the deltas.

Stage 17 may include processing of the snapshots redundancy information by applying a second protection scheme. The second protection scheme may differ from (or be equal to) the first protection scheme. The second protection scheme can be set in advance and/or determined based upon a protection metric of the snapshots. The protection metric may be any metric that may provide an indication about the protection of the snapshots. It may reflect an actual protection level, an estimated protection level, may reflect previous failures and/or successes in reading data, may reflect error rates and the like.

Stage 17 may be followed by stage 19 of associating the snapshots blocks with the snapshots redundancy information and storing the snapshots redundancy information in the storage system.

Referring to FIG. 3—method 20 may differ from method 10 by further including stages 14 and 16 wherein stage 12 is followed by stage 14.

Stage 14 may include evaluating a protection metric of the snapshots.

Stage 14 may be followed by stage 16 of determining, in response to the protection metric, a second protection scheme to be applied during the processing of the snapshots blocks.

Referring to FIG. 4—method 30 may differ from method 10 by further including stages 14 and 15, wherein stage 12 is followed by stage 14.

Stage 14 may include evaluating a protection metric of the snapshots.

Stage 14 may be followed by stage 15 of determining, in response to the protection metric whether to process the snapshots blocks to provide snapshots redundancy information.

If it determined to process the snapshots blocks then stage 15 is followed by stage 17, else stage 15 is not followed by stage 17 and the method ends (END 19).

The invention may also be implemented in a computer program for running on a computer system, at least including code portions for performing steps of a method according to the invention when run on a programmable apparatus, such as a computer system or enabling a programmable apparatus to perform functions of a device or system according to the invention.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Each signal described herein may be designed as positive or negative logic. In the case of a negative logic signal, the signal is active low where the logically true state corresponds to a logic level zero. In the case of a positive logic signal, the signal is active high where the logically true state corresponds to a logic level one. Note that any of the signals described herein may be designed as either negative or positive logic signals. Therefore, in alternate embodiments, those signals described as positive logic signals may be implemented as negative logic signals, and those signals described as negative logic signals may be implemented as positive logic signals.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method for protecting snapshots related to a logical unit, the method comprises:
retrieving snapshots blocks that were destaged in a storage system prior to the retrieving, wherein the snapshot blocks form snapshots, and wherein the snapshots blocks comprise snapshots data blocks reflecting a content of snapshots and parity blocks, wherein the parity blocks were calculated during a destaging of the snapshots blocks and prior to the retrieving of the snapshots blocks;
processing, by the storage system, the snapshots blocks to provide, by an information protection module of the storage system, snapshots redundancy information, wherein the snapshots redundancy information is provided in addition to the parity blocks; and storing the snapshots redundancy information in the storage system.

2. The method according to claim 1 wherein the snapshots blocks form snapshots that represent contents of the logical unit at different points in time; wherein the snapshots are associated with snapshots metadata; wherein the snapshots metadata facilitates a retrieval of deltas indicative of differences between different snapshots; wherein the processing of the snapshots blocks comprises processing snapshots blocks of deltas to provide at least a portion of the snapshots redundancy information.

3. The method according to claim 1 further comprising associating the snapshots blocks with the snapshots redundancy information.

4. The method according to claim 1 wherein the parity blocks were calculated by applying a first protection scheme before the retrieving of the snapshots blocks; wherein the processing of the snapshots blocks involves applying a second protection scheme.

5. The method according to claim 4 wherein the first protection scheme differs from the second protection scheme.

6. The method according to claim 4 wherein the first protection scheme equals the second protection scheme.

7. The method according to claim 1 further comprising evaluating a protection metric of snapshots associated with the snapshots blocks; and determining, in response to the protection metric, a second protection scheme to be applied during the processing of the snapshots blocks.

8. The method according to claim 1 further comprising evaluating a protection metric of snapshots associated with the snapshots blocks; and determining, in response to the protection metric, whether to (a) execute the processing of the snapshots blocks or (b) prevent from processing of the snapshots blocks.

9. A method for protecting snapshots related to a logical unit, the method comprises:
retrieving snapshots blocks that were destaged in a storage system prior to the retrieving, wherein the snapshot blocks form snapshots, and wherein the snapshots blocks comprise snapshots data blocks reflecting a content of snapshots and parity blocks, wherein the parity blocks were calculated during a destaging of the snapshots blocks and prior to the retrieving of the snapshots blocks;
evaluating a protection metric of the snapshots associated with the snapshots blocks;
determining, in response to the protection metric, whether to process the snapshots blocks to provide snapshots redundancy information;
if it determined to process the snapshots blocks then:
processing the snapshots blocks, by an information protection module of the storage system, to provide the snapshots redundancy information, wherein the snapshots redundancy information is provided in addition to the parity blocks; and
storing the snapshots redundancy information in the storage system; and
if it determined not to process the snapshots blocks then preventing from processing the snapshots blocks thereby preventing from providing the snapshots redundancy information.

10. A non-transitory computer readable medium that stores instructions to be executed by a computerized system for retrieving snapshots blocks that were destaged in a storage system prior to the retrieving, wherein the snapshot blocks form snapshots, and wherein the snapshots blocks comprise snapshots data blocks reflecting a content of snapshots and parity blocks, wherein the parity blocks were calculated during a destaging of the snapshots blocks and prior to the retrieving of the snapshots blocks; processing, by the storage system, the snapshots blocks to provide, by an information protection module of the storage system, snapshots redundancy information, wherein the snapshots redundancy information is provided in addition to the parity blocks; and storing the snapshots redundancy information in the storage system.

11. The non-transitory computer readable medium according to claim 10 wherein the snapshots blocks form snapshots that represent contents of the logical unit at different points in time; wherein the snapshots are associated with snapshots metadata; wherein the snapshots metadata facilitates a retrieval of deltas indicative of differences between different snapshots; wherein the processing of the snapshots blocks comprises processing snapshots blocks of deltas to provide at least a portion of the snapshots redundancy information.

12. The non-transitory computer readable medium according to claim 10 that stores instructions for associating the snapshots blocks with the snapshots redundancy information.

13. The non-transitory computer readable medium according to claim 10 wherein the parity blocks were calculated by applying a first protection scheme before the retrieving of the snapshots blocks; wherein the processing of the snapshots blocks involves applying a second protection scheme.

14. The non-transitory computer readable medium according to claim 13 wherein the first protection scheme differs from the second protection scheme.

15. The non-transitory computer readable medium according to claim 13 wherein the first protection scheme equals the second protection scheme.

16. The non-transitory computer readable medium according to claim 10 that stores instructions for evaluating a protection metric of snapshots associated with the snapshots blocks; and determining, in response to the protection metric, a second protection scheme to be applied during the processing of the snapshots blocks.

17. The non-transitory computer readable medium according to claim 10 that stores instructions for evaluating a protection metric of snapshots associated with the snapshots blocks; and determining, in response to the protection metric, whether to (a) execute the processing of the snapshots blocks or (b) prevent from processing of the snapshots blocks.

18. A storage system comprising: a destage and retrieval module that is arranged to retrieve snapshots blocks that were destaged in the storage system prior to the retrieving, wherein the snapshot blocks form snapshots, and wherein the snapshots blocks comprise snapshots data blocks reflecting a content of snapshots and parity blocks, wherein the parity blocks were calculated during a destaging of the snapshots blocks and prior to retrieving the snapshots blocks; an information protection module that is arranged to process the snapshots blocks to provide snapshots redundancy information, wherein the snapshots redundancy information is provided in addition to the parity blocks; wherein the destage and retrieval module is further arranged to store the snapshots redundancy information in the storage system.

* * * * *